United States Patent [19]
Blomley

[11] 4,286,123
[45] Aug. 25, 1981

[54] BRIDGE AMPLIFIER

[75] Inventor: Peter F. Blomley, Bishop's Stortford, England

[73] Assignee: International Standard Electric Corporation, New York, N.Y.

[21] Appl. No.: 20,647

[22] Filed: Mar. 15, 1979

[30] Foreign Application Priority Data

Nov. 8, 1978 [GB] United Kingdom ............... 43602/78

[51] Int. Cl.³ ............................................. H03F 3/62
[52] U.S. Cl. ............................... 179/170 T; 179/1 A; 179/81 B; 179/170 R
[58] Field of Search ................. 179/1 A, 81 B, 170 R, 179/170 T, 1 HF, 81 R, 81 A, 170 NC; 178/70 R, 70 TS

[56] References Cited

U.S. PATENT DOCUMENTS

| | | | |
|---|---|---|---|
| 3,175,050 | 3/1965 | Oxman | 179/170 T |
| 3,238,310 | 3/1966 | Wells | 179/170 T |
| 3,359,378 | 12/1967 | Skeer | 179/170 R |
| 3,529,099 | 9/1970 | Ribner | 179/81 A |
| 3,573,402 | 4/1971 | Chambers, Jr. | 179/1 A |
| 3,882,274 | 5/1975 | Vice et al. | 178/70 TS |
| 4,004,091 | 1/1977 | Marley et al. | 178/70 R |

Primary Examiner—Bernard Konick
Assistant Examiner—Randall P. Myers
Attorney, Agent, or Firm—James B. Raden; Marvin M. Chaban

[57] ABSTRACT

A four-transistor bridge amplifier is adapted for use as a bidirectional speech amplifier between a telephone line and an electronic telephone subscriber's instrument. The amplifier is powered from the line and includes two-transistor sections, one or other of which functions dependent on line polarity. The output of the amplifier to the subscriber instrument is taken across a resistor connected between the transistors such that the output always has the same relative polarity whatever the line polarity.

13 Claims, 5 Drawing Figures

BRIDGE AMPLIFIER

BACKGROUND OF THE INVENTION

This invention pertains to bidirectional amplifiers, in general, and to a bridge amplifier for an electronic telephone set in particular.

Such amplifiers are needed in so-called telephone circuits, i.e., telephone subscriber's instrument circuits in which the transducers are coupled to the telephone line via amplifiers. Such amplifiers, and indeed the whole instrument circuit, are preferably line-powered. In such case, it is highly desirable for the circuit to be polarity insensitive, since one can never be certain without performing tests which of the two wires is the more positive one. It is also desirable for the circuit of such a telephone to be so designed as to be usable in a wide variety of telephone line conditions.

SUMMARY OF THE INVENTION

According to the invention, there is provided a bidirectional amplifier adapted to be connected to a two-wire line which forms both a first signal input and a first signal output and in which the direct current supply for the amplifier is received over the two-wire line. The amplifier includes first and second transistors having their collectors connected respectively to the two wires of the line. The emitters of the first and second transistors are connected together and to a first common point. The amplifier also includes third and fourth transistors also having their collectors connected respectively to the two wires of the line, the bases of the third and fourth transistors being connected together and to a second common point. A resistive impedance is connected between the first and the second common points so that the relative polarity of the first and the second common points is the same irrespective of the relative polarities of the two wires of the line. The second signal output from the amplifier is taken from across the resistive impedance so that a signal received over the line appears across the resistive impedance. The second signal input to the amplifier is applied to the bases of the first and the second transistors, the signal applied to the bases of the first and the second transistors being applied from the amplifier to the line.

BRIEF DESCRIPTION OF THE DRAWINGS

An embodiment of the invention will now be described with reference to the accompanying drawings, in which.

DETAILED DESCRIPTION OF THE DRAWINGS

Figure 1:
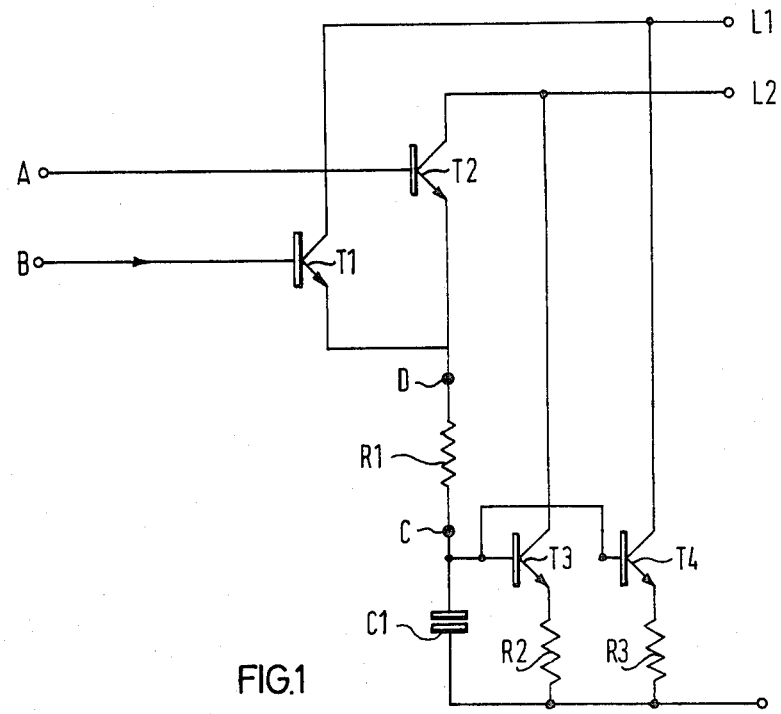
FIG. 1 is an amplifier embodying the invention.

In the circuit of FIG. 1, which is designed for use in a telephone instrument circuit, there are four transistors T1, T2, T3 and T4 of which T1 and T2 are of larger size than T3 and T4. In the case of an integrated circuit implementation, this means that these transistors T1 and T2 are larger area devices than T3 and T4. The line wires are shown at L1 and L2 and are each connected to the collectors of two of the transistors. The transmitter, i.e., the microphone in the present case, is connected via other circuit elements (see FIG. 4) to terminals A and B, and thus, to the bases of T1 and T2. The receiver, i.e., the earphone or the loudspeaker in the case of a loudspeaking telephone, is so connected as to be driven from the voltages developed across—R1—see also FIG. 4.

As already mentioned, line terminal L1 can be positive or negative, in which case L2 is negative or positive respectively. Thus, if L1 is positive, current from the line flows into L1, via the collector-emitter path of T1, the resistor R1, the base-collector path of T3, and therefrom back to L2. With L2 positive, the current flows into L2, via the collector-emitter path of T2, the resistor R1, the base-collector path of T4, and therefrom back to L1. Note that in both cases, the current flows in the same direction in the resistor R1. Hence, this resistor can be used, in effect, to define via feedback loops, etc., the transfer gain between D and C at the ends of the resistor R1 and the line terminals. This will be made more clear by considering half only of the circuit of FIG. 1—see FIG. 2.

Figure 2:
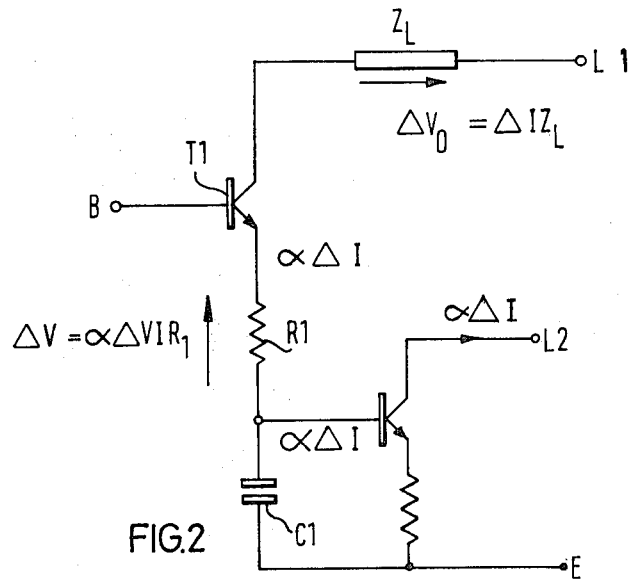
FIG. 2 is part of the circuit of FIG. 1, shown separately for explanation purposes.

Some of the current and voltage conditions, relevant to the operation of the circuit, are indicated in FIG. 2. The voltage gain from R1 to the line is defined by $$G = \frac{\Delta V_o}{\Delta V} = \alpha \frac{Z_L}{R_1}$$

$V_o$ is the output voltage, and as $\alpha$ tends to unity, we have $$g = \frac{Z_L}{R_1}$$

$Z_L$ being an external line impedance and $R_1$ an external resistor connected between the two common points C and D. One of the common points is the commoned connection of the emitters of T1 and T2, and the other is the commoned connection of the bases of T3 and T4. Hence, the voltage gain between the line and R1 is simply a ratio of impedances.

As the majority of the line current $I_1$ flow through the output stage T3, the mean value of the voltage across R1 can be used to convey information as to the line current. This enables changes in the line voltage-line current characteristic to be made predictably on the basis of comparisons between the mean voltage across R1 and an accurate internal voltage standard.

Since the transistor T3 has almost all of the line current flowing in its collector base junctions, the transistor is in heavy saturation so that the voltage on its emitter is very close to that on its collector. This means that this transistor's impedance is very low so that the voltage drop due to the bridge amplifier is correspondingly low. This condition also gives the negative potential needed for the drive circuits when the amplifier forms part of an electronic telephone instrument circuit. It has previously been assumed, in the design of such circuits, that both the drive circuits and the output circuits need a voltage very close to the voltage on the "rails" of the circuit. However, in very low voltage operations, e.g., when the instrument is at the end of a long line, the current available limits the output voltage swing. This makes it possible to design a circuit which works at 1.5 volts, normally set by the drive circuit, and give 1 volt peak-to-peak output drive if there is enough current to drive that into an impedance of around 300 ohms.

The configuration of T3 was chosen because, in other configurations, the possibility of emitter-base breakdown would have caused problems. A study of FIG. 1 shows that in all cases, the line current "sees" the collector of an NPN transistor.

Note that when L1 is positive to L2, the presence of T2 and T4 has relatively little effect on the operations. Similarly, when L2 is positive to L1, and T2 and T4 are the effective transistors, the presence of T1 and T3 has relatively little effect.

To render the description more clear, we now describe a practical example. In a circuit such as FIG. 2, the swing to the line in the presence of a signal is given by $2(V_{BC}+I_LR+V_s)$ from the direct voltage lead $V_2$, where $V_{BC}$ is the base-collector voltage of T3 and $V_s$ is the voltage across T1 when saturated. The multiplication by two is to give the peak-to-peak swing. In a practical case with $I_L=8mA$, $R_1=10$ ohms, $V_{BC}=0.7$ volts and $V_s=0.2$, the bracketed expression has a value of 0.98 volts, assuming that the voltage across the line is only 1.8 volts. As already indicated, such a low voltage state may well exist in long lines. With the parameters quoted, we thus have a 1.6 volt peak-to-peak swing capability. The ideal current-limited value is then $$\frac{8 \times 300}{1000} = 2.4 \text{ volts}$$

However, by inspection, it will be seen that due to the saturation of T3, a voltage is available which is equal to the line voltage, plus $V_{SAT}$.

The value of the line current $I_1$ is assumed for the purpose of explanation to be around 5 mA, assuming that the rest of the circuit unit including the amplifier takes 3 mA. Thus, the available current from T3 emitter could approach this value, assuming that the current levels quoted are not interrelated. However, when a signal is applied, the value of the current $I_L$ fluctuates so the available load current also changes. In an extreme case, the signal current may cause the base current to go to zero which reduces the load current available from the circuit to zero. To overcome this limitation and to allow negative current to flow through the bridge, the capacitor C1 is included. This capacitor stores the energy for the peak negative excursions. We have $V_{C1}=V_{BE}-I_LR$, where $V_{C1}$ is the voltage across C1 and R is the value of R1. The resistor R2 in the emitter circuit of T3 (and the corresponding resistor R3 and T4) is used to avoid looping current going around the "bottom" pair of the bridge.

When a circuit such as that described above is to be implemented in an integrated circuit form, it is necessary to ensure the elimination of the substrate injection in T3 and T4, depending on the direction of current flow between L1 and L2. As these transistors are saturated in one or other of these cases, the collector-base junction of whichever of T3 and T4 conducts injects charge into the substrate, and this current injection, which may be as much as 30-50% of $I_1$, can cause difficulty due to the voltage change it causes at point E, FIG. 2. For the circuit to be effective, this substrate injection has to be reduced to at most 1% of the line current. At the same time, however, the reverse current gain of T3 and T4 mustn't be degraded, otherwise the negative voltage available at E would change in a manner dependent on current drawn from the driven circuits.

Figure 3:
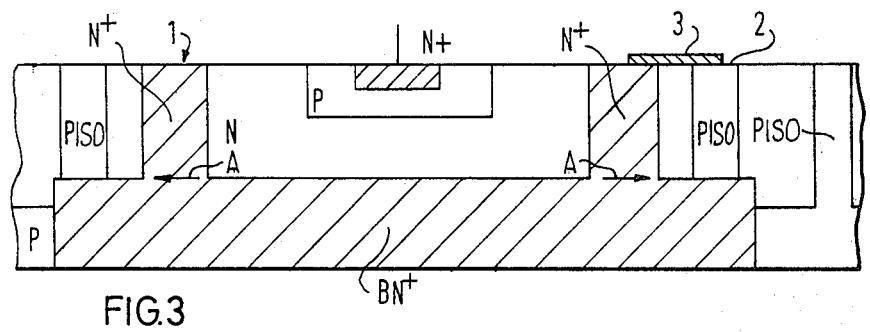
FIG. 3 is a cross-section on a greatly enlarged scale of part of an integrated circuit implementation of the amplifier of FIG. 1.

The above difficulties, due to substrate injection, do not, of course, apply if one is implementing the circuit described herein using discrete components. To overcome the difficulties in an integrated circuit implementation, the transistor T3 (and also T4) is surrounded by a field barrier which is effective at low currents, and a substrate wall which is effective at high currents. This approach is shown schematically in FIG. 3 which shows the arrangement of T3 formed by an N+ region for the emitter, a P region for the base and an N region for the collector. The field barrier is the BN+ region shown at 1 and the substrate wall is the $P_{ISO}$ region 2 which surrounds the barrier and is connected to it by the contact 3. The advantage of the field barrier 1 is that it provides effective reflection of the carriers from the wall and sides so that at low currents (5-20 mA), the reverse gain of the transistor remains high. However, as the current increases, the leakage of carriers under the barrier at A causes a marked increase in substrate current. It is to avoid this that a floating substrate wall (2) is used, this wall being isolated from the actual substrate by the region BN+ which collects all the stray minority carriers.

The substrate current referred to above is produced as a result of the voltage drop across R2 (or, of course, R3 in the case of T4), and as already indicated, it is caused by sub-barrier leakage especially at the higher current levels. As the liftime of the minority carriers thus injected into the substrate is very small in the buried layer region, the P wall is effective to eliminate the substrate current. The fact that the P+ (ISO) wall is placed after the N+ barrier gives good reverse gain for the transistor because of the minority carriers "pile-up" in the N+ region, and because it provides a collection system for the "stray" carriers which diffuse through the lowerment part of the N+ barrier.

We have already referred to the fact that T1 and T2 need to be relatively large transistors so that a reasonable $V_{BE}$ is attaind with a current of 150 mA. In the integrated circuit implementation, this is effective by ensuring that T1 and T2 occupy much larger areas of the semiconductor chip than do T3 and T4.

Figure 4:
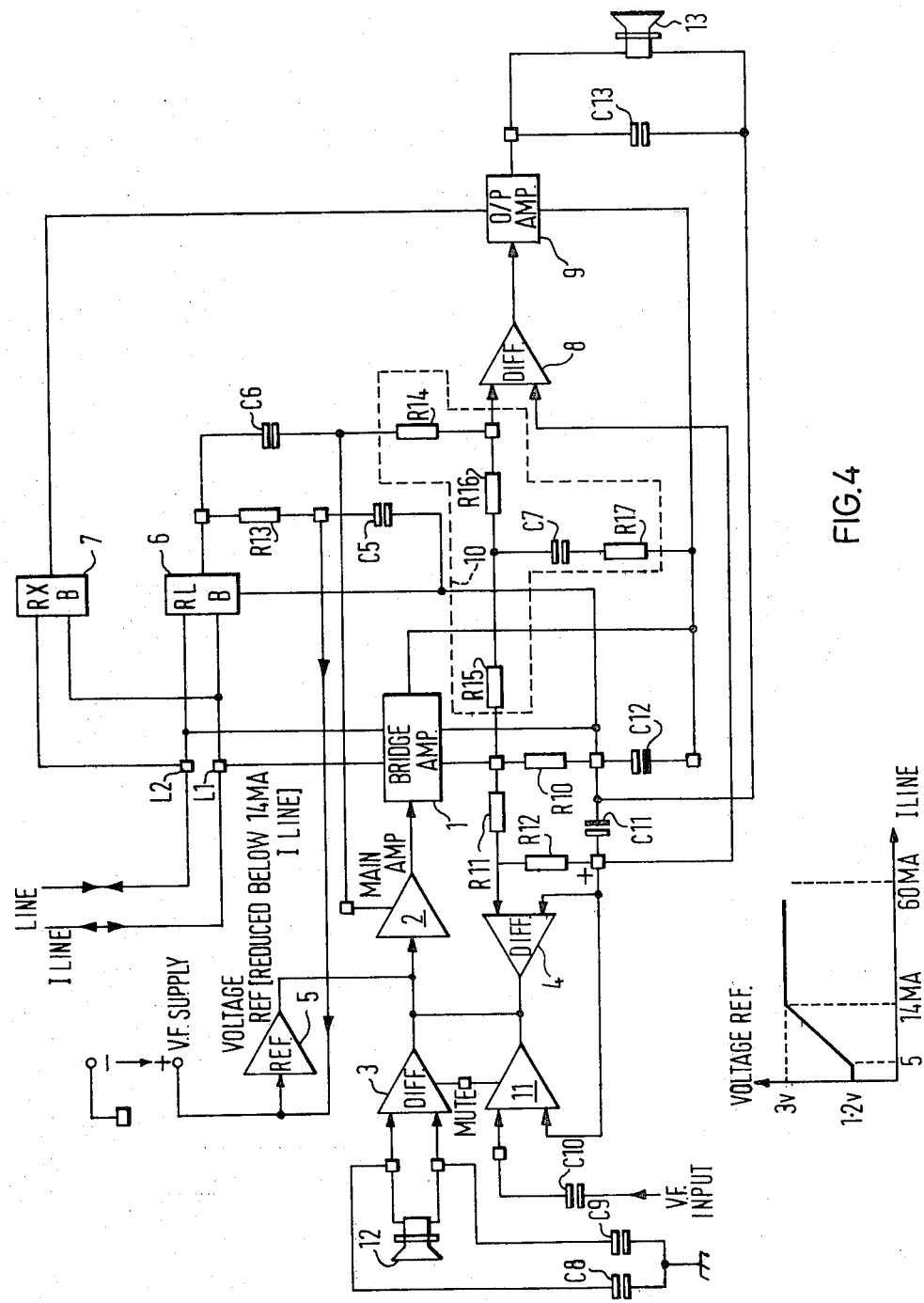
FIG. 4 is a block diagram of a circuit for use in a telephone instrument in which a circuit embodying the invention is used.

FIG. 4 shows how a circuit such as that of FIG. 1 fits into a telephone instrument circuit, the bridge amplifier of FIG. 1 being represented by the block 1, labelled Brdige Amp. The other blocks are identified as follows:
2 Main Amplifier
3 Differential Input Amplifier
4 Differential Feedback Amplifier
5 Band Gap Voltage Reference
6 Positive Loss Bridge
7 Receiver Bridge
8 Receiver Differential Amplifier
9 Receiver Output Amplifier
10 Side Tone Network
11 Tone Dialling (Voice Frequency) Input Differential Amplifier As will have become apparent from the description of FIG. 1, the function of the bridge amplifier 1 is to drive the transmitter signal to the line terminals L1 and L2 independent of the direct current polarity of these terminals. In addition to this, the bridge amplifier makes available to the remainder of the circuit the voltage at the more negative of the terminals L1 and L2 with very little voltage drop. This latter is most important on a fairly long line where the line current and hence, line voltage available is in any case low. It is also important when two or more telephone instruments are connected in parallel to the same line. This is especially so if one of the instruments is of the old carbon microphone type since such an instrument can, in the absence of a circuit such as the bridge amplifier 1, effectively disable an "electronic" subset circuit in parallel with A.

The current which flows through the line terminals L1 and L2 also passes through the resistor R10 which corresponds to the resistor R1 in FIG. 1. Thus, as the current gain of the bridge amplifier 1 is close to unity, e.g., 0.98, the voltage present across R10 can be used to define the current to the line by sensing the voltage across R10, and under the control of that voltage defining the line current via a feedback loop including the differential amplifier 4, see below. As the loop gain needed to achieve this is high, further gain is provided by the main amplifier 2 which increases the loop gain through the bridge amplifier 1, differential feedback amplifier 4 and main amplifier 2 to about 1000.

The use of an active feedback system, including the differential amplifier 4 plus the resistors R11 and R12 instead of the more usual passive feedback loop, makes it possible to control the amount of feedback by changing the amount of current which flows in this amplifier 4. This, in turn, enables the transmitter gain to be controlled. The arrangement also compensates for the non-linear characteristics of the input differential amplifier 3 and for the temperature coefficients of various parts of the circuit.

With the above arrangement, the gain from the input terminals of the amplifier 3, to which terminals the microphone 12 is connected, to the resistor R10, is defined as $$G_1 = \frac{I(3)}{I(4)} \cdot \frac{R_{11} + R_{12}}{R_{11}}$$

where I(3) is the current in amplifier 3 and I(4) is the current in amplifier 4. Hence, in order to offer such features as gain regulation, e.g., for line attenuation compensation, all that is needed to change is the magnitude of I(3) to I(4). Further, as the gain to the line terminals L1 and L2 is accurately defined being in effect $R_{L/R_6}$, the overall gain is also well defined.

We now consider the tone signal input which is one or more voice-frequencies used when tone "dialling" is used whether direct from a dial or pushbutton set or from a repertory dialler. The voice frequency supply is via the capacitor C10 to the differential amplifier 11 and therefrom to the main amplifier 2. As the amplifier 11 is also a differential amplifier with a current of $I_{(11)}$ in the device, the gain to which the voice frequency input is subjected is also defined simply as a ratio of currents and resistors. Hence, no further description of this input is considered necessary except to note that the amplifier 11 has an output labelled MUTE which reduces the gain of the amplifier 3 when a voice-frequency signal input is present.

The circuit shown includes a further bridge arrangement which is important in the transmitter path, this being the positive load bridge 6. This is a network which connects either terminal L1 or L2, whichever is the more positive relative to the output fo the amplifier 1 to the upper end of resistor R13. Note here that the output of the amplifier 1 is the circuit's negative supply terminal.

The resistance R13 is the termination resistance of the network, and in the present case, it has a value of 600 ohms. It is effectively across the terminals L1 and L2 via the capacitor C5 and the negative switch portion of the bridge amplifier 1 for speech signals only.

The output of the bridge 6 also provides the positive voltage supply for the whole of the circuit. Since this voltage and the feed from the lower terminal of R11 has to be stabilized at around 3 volts, an internal voltage reference 5 is included in the main amplifier loop. Note that this voltage also drives the voice frequency generation circuits (not shown). Basically, the voltage at the lower terminal of R13 is sensed by the input of the reference amplifier, and the output from this amplifier controls the voltage across L1 and L2 so as to make the voltage constant and equal to 3 volts over a wide range of line currents—see the graph inset to FIG. 4.

An additional feature (not shown) is a circuit which senses the line current, and when it falls below 14 mA adjusts the reference voltage provided by the amplifier 5. This enables an improved performance to be achieved in such case.

The received voltage, speech signal only across the line, appears across the resistor R13 due to the action of the bridge 6 and hence, also appears across the series combination of capacitor C6 and resistor R14. From there it is applied to the input terminal of the receiver differential amplifier 8 which ultimately feeds the earpiece transducer 13. This amplifier 8 amplifies this signal and applies it to the output amplifier 9 which, in turn, drives the earpiece 13. Thus, amplifier 13 also has a control connection over another bridge arrangement 7 which connects whichever of L1 or L2 is more negative to the amplifier 9. This additional bridge arrangement is needed because of the large amount of current taken by the amplifier 9. This large current consumption could otherwise have negated the use of the other bridge 6 because of the voltage drop produced across R13.

The side tone network R15-R16-R14-C7-R17 is fundamentally a balance network which nulls the transmitter signals which appears across R10 by feeding an equal and opposite signal thereto via C6 and R14. The capacitor C7 and the resistor R17 are used for phase compensation for the practical situation of having the terminals L1 and L2 connected to an actual telephone line.

Capacitors C8, C9 and C10 are used to avoid frequency interference, C11 is used to avoid DC offsets and C12 is the bridge amplifier capacitor (corresponding to C1 in FIG. 1).

Figure 5:
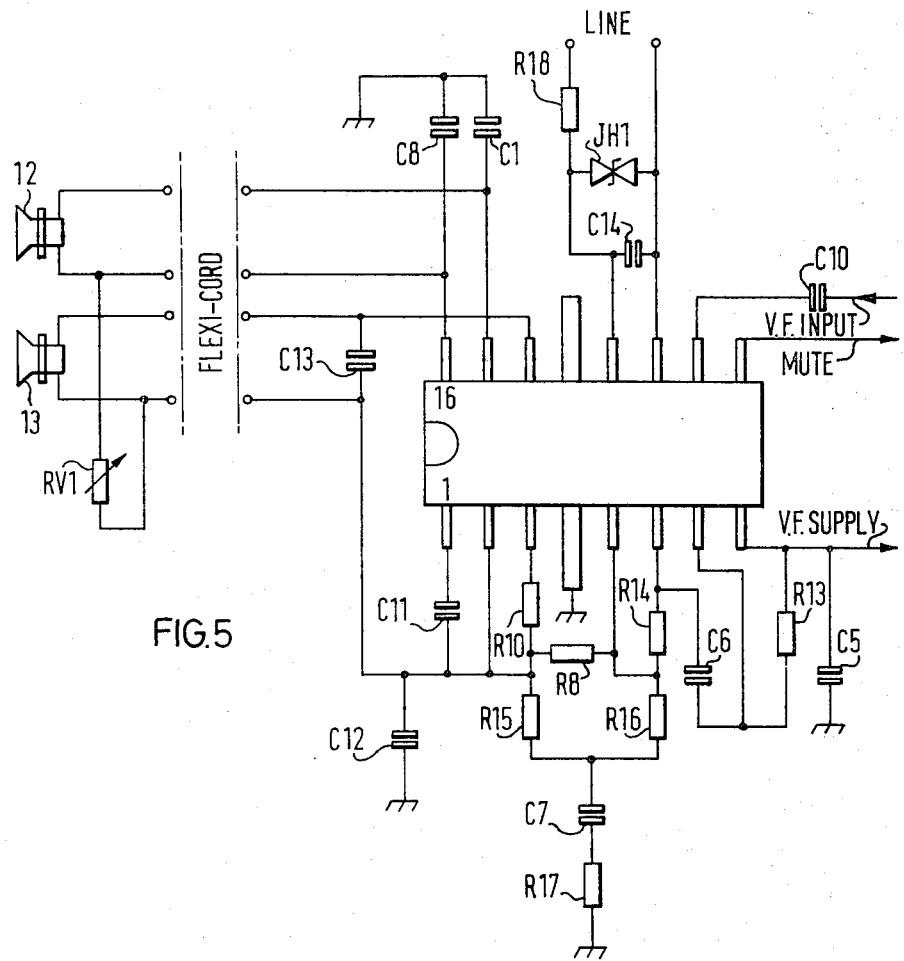
FIG. 5 is a further diagram indicating which of the elements of FIG. 4 is external to the integrated circuit chip.

FIG. 5 shows the arrangements of external components when the majority of the circuitry shown in FIG. 4 is implemented as an integrated circuit chip. The same references are used as in FIG. 4. Resistor R18, capacitor C14 and the suppressor JH1 are the usual protection circuitry provided to protect the circuit against undesirable line conditions such as lightning strikes. The variable resistor RV1 connects the wires to the earpiece 13 at the mouthpiece 12 for adjustment purposes.

What is claimed is:

1. A bidirectional amplifier adapted to be connected to a two-wire line and to signal generating and receiving circuits, wherein said amplifier receives power from said line and wherein said amplifier is adapted such that current flows in the same direction from said circuits regardless of the polarity of said two-wire line, said amplifier comprising:
first and second common points;
first, second, third and fourth transistor means each having first, second and third terminals;
said first terminals of said first and fourth transistors being coupled to one line of said two-wire line, said first terminals of said second and third transistors being coupled to the other line of said two wire-line;
said second terminals of said first and second transistors being coupled to said first common point;
said third terminals of said third and fourth transistors being coupled to said second common point;
first resistive means coupled to said first and second common points such that input signals from said two-wire line are reproduced across said first resistive means with the same relative polarity between said first and second common points;
first means coupling said first and second common points to said receiving circuits;
second means coupling said third terminals of said first and second transistor means to said signal generating circuits such that input signals from said signal generating circuits are reproduced on said two-wire line;
a third common point;
second resistive means connected between said second terminal of said third transistor means and said third common point; and
third resistive means connected between said second terminal of said fourth transistor means and said third common point; and
capacitor means connected between said second and third common points, said third common point providing a direct voltage output point.

2. An amplifier in accordance with claim 1, wherein said first and second transistor means are substantially similar to each other, wherein the third and fourth transistor means are substantially similar to each other, and wherein said first and second transistor means are of larger physical size than said third and fourth transistor means so that either said third or said fourth transistor means, when conductive, is in a saturated condition.

3. An amplifier in accordance with claim 1, wherein said amplifier is an integrated circuit unit, and in which the third and fourth transistor means are each surrounded in the integrated circuit substrate by a floating field barrier.

4. A bidirectional amplifier in accordance with claim 1, wherein said signal generating circuit comprises a telephone subscriber's instrument transmitter and said signal receiving circuit comprises a telephone subscriber's instrument receiver.

5. A bridge amplifier adapted for bidirectional signal transfer through a two-wire line, said amplifier comprising a first and a second pair of transistors connected in a four-arm bridge arrangement, with the transistors of each pair being in opposite arms of the bridge and with each pair of transistors being coupled to both wires of the line, an input device for supplying signals for transmission to said line and an output device for receiving signals from said line, said first pair of transistors operative to supply current to said output device, said output device being serially coupled between the transistors of said first transistor pair when a first wire of said two wire line is positive and between the transistors of said second pair of transistors serially coupled to supply current to said output device when the second wire of said two wire line is positive, one transistor of each pair having a first terminal coupled to said first wire and the other transistor of each pair having a first terminal coupled to said second wire, said input device coupled to a second terminal of each pair of transmit signals through the bridge of the two wire line regardless of which wire of the line is positive and a third terminal of a transistor of each pair coupled together whereby the last mentioned transistor coupling provides a source of current derived from the line.

6. A bridge amplifier as claimed in claim 5 in which the two wires of the line are connected to opposite corners of the bridge arrangement, and in which said output device is coupled to the remaining corners of the bridge arrangement.

7. A bridge amplifier as claimed in claim 6 in which the collector terminal of one transistor in each pair is coupled to the first wire of the line and the collector terminal of one transistor out of each pair is coupled to the second wire.

8. A bridge amplifier as claimed in claim 7, in which the input device comprises a microphone coupled to the base of one transistor of each transistor pair.

9. A bridge amplifier as claimed in claim 8 in which said transistors are fabricated in an integrated circuit and in which two of said transistors are surrounded in the integrated circuit substrate by a floating barrier field.

10. A telephone station circuit for coupling a receiver and a transmitter to a two wire line in which the line supplies direct current to the station circuit with either wire of the line capable of exhibiting positive potential, a four arm bridge with the line coupled to opposite corners of said bridge and the receiver coupled across the remaining corners of the bridge, each bridge arm containing a transistor, the transistors coupled in said bridge to complete undirectional paths from the line through a pair of said transistors to the receiver regardless of the polarity of the line wires, with the transmitter coupled to the base of a transistor, in a first arm and a transistor in a second arm of said bridge with said first and second arms being adjacent one another, said bridge being configured to feed signals to the receiver over different paths through alternate arms of the bridge regardless of the polarity of the line and a further path from said line through a transistor in a third arm and a transistor in a fourth arm in said bridge for providing power from said line to said station circuit.

11. A station circuit as claimed in claim 10, in which there are first amplification means coupled to the transmitter and second amplification means coupled to the receiver.

12. A station circuit in accordance with claim 11, further comprising an active feedback path extending from the input of said second amplification means to a point between said transmitter and said first amplification means, said feedback path including said first differential amplifier.

13. A station circuit in accordance with claim 12, in which said second differential amplifier means has inputs adapted to receive signals from said line for said receiver and an output connection connected to said bridge for inhibiting signals from said transmitter while signalling is in progress.

* * * * *